United States Patent [19]

Tokumaru

[11] 4,448,499
[45] May 15, 1984

[54] IMAGE TRANSMITTER FOR COPYING APPARATUS OF SLIT EXPOSURE SCANNING TYPE

[75] Inventor: Hisashi Tokumaru, Osaka, Japan

[73] Assignee: Minolta Camera Kabushiki Kaisha, Osaka, Japan

[21] Appl. No.: 265,795

[22] Filed: May 21, 1981

[30] Foreign Application Priority Data

May 25, 1980 [JP] Japan ............................. 55-72399

[51] Int. Cl.³ .............................................. G02B 27/00
[52] U.S. Cl. .................................. 350/573; 350/167; 355/50
[58] Field of Search .................. 350/573, 167; 355/50

[56] References Cited

U.S. PATENT DOCUMENTS

| Re. 28,162 | 9/1974 | Anderson | 95/18 |
|---|---|---|---|
| 3,447,438 | 11/1965 | Kaufer | 95/15 |
| 3,580,675 | 5/1971 | Hieber | 355/50 |
| 3,584,950 | 6/1971 | Gundlach | 355/50 |
| 3,584,952 | 6/1971 | Gundlach | 355/52 |
| 3,592,542 | 7/1971 | Kaufer | 355/50 |
| 3,655,284 | 4/1972 | Agliata | 355/18 |
| 4,168,900 | 9/1979 | Adachi | 355/1 |
| 4,275,962 | 6/1981 | Midorikawa et al. | 355/50 |

FOREIGN PATENT DOCUMENTS 45-30787 10/1970 Japan .
54-17029 2/1979 Japan .

*Primary Examiner*—Jon W. Henry
*Attorney, Agent, or Firm*—Jackson, Jones & Price

[57] ABSTRACT

The invention comprises an improvement to a compact copying apparatus of a slit exposure scanning type. A plurality of sheets of plastic lens elements provide an array of optical erecting lens systems that combine to provide overlapping images of an original on an image recording member. The optical system is designed to comply with predetermined parameters of distance between the original and the image recording planes, the magnification of the inverted real image, the maximum effective aperture of the lens system, and the distance between respective edges of maximum effective apertures of adjacent lens systems.

16 Claims, 10 Drawing Figures

IMAGE TRANSMITTER FOR COPYING APPARATUS OF SLIT EXPOSURE SCANNING TYPE

BACKGROUND OF THE INVENTION

1. Field of the Invention

The present invention relates generally to an erecting optical imaging system for compact copying apparatus, and more particularly, to an image transmitter for a copying apparatus of a slit exposure scanning type wherein the original document and the image recording member are relatively movable in a scanning direction relative to the image transmitter. The image transmitter includes an array set of parallel offset rows of lens elements that provide an overlapping field angle in the scanning direction.

2. Description of the Prior Art

The field of copying apparatus, particularly in the smaller compact copiers for office applications, has become increasingly competitive with demands for both speed and reproduction clarity. Various forms of optical systems have been suggested and utilized in the copier field, including plurality of erecting lens systems arranged in a direction transverse to the scanning direction. The problems of providing the reproduction clarity required while removing vignetting, spherical aberration, and field curvature problems have frequently plagued the prior art attempts to provide a compact scanning copier apparatus. Various suggestions have existed in the patent literature for image transmitters, such as those disclosed in the U.S. Pat. No. RE28,162, U.S. Pat. Nos. 3,447,438, 3,580,675, 3,584,950, 3,584,952, 3,592,542, 3,655,284, and 4,168,900. Additionally, various foreign patent publications have also addressed these prior art problems, such as Japanese Patent Application that has been laid open for inspection No. 54-17029, and Japanese Patent Application No. 45-30787.

While these image transmitters have succeeded in reducing the distance between the original document and the image recording member to permit the production of a compact copying apparatus, there is still a demand in the prior art to provide an improved image transmitter, especially for the purpose of increasing the speed or effective f number of the imaging lens system, while maintaining acceptable image-forming optical performance and ease of manufacturing.

SUMMARY OF THE INVENTION

An object of the present invention is to provide an erect optical imaging system for copying apparatus of a compact and economical size with increased speed.

Another object of the present invention is to provide an image transmitter that can be economically manufactured.

Still another object of the present invention is to provide an image transmitter with an improved image-forming optical performance.

A further object of the present invention is to provide an image transmitter with a uniform illumination on the image recording member in a direction transverse to the scanning direction.

In each of the erecting lens systems of the image transmitter described herein, a first pair of lens elements are utilized for forming an interim inverted real image of the original, while a second pair of lens elements are used for relaying the inverted real image to finally form an erect real image of the original on the image recording member. The final image is formed by the respective erecting lens systems that collectively form an array of the image transmitter which partially overlap each other on the image recording member. The image transmitter can be further defined in accordance with the parameters of the present invention by the following conditions:

$$0.45 < |\beta_M| < 0.7$$

$$0.05 < l/D < 0.35$$

$$0.02 < D/L < 0.05$$

wherein: $\beta_M$ represents the magnification of the inverted real image formed by the first pair of lens elements; D represents the maximum effective aperture of the lens system; l represents the distance between respective edges of the maximum effective apertures of two adjacent erecting lens systems; and L represents the distance along the optical axis between the original and the image recording member.

The objects and features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENTS

The following description is provided to enable any person skilled in the copier field to make and use the invention and sets forth the best modes contemplated by the inventor for carrying out his invention. Various modifications, however, will remain readily apparent to those skilled in the art since the generic principles of the present invention have been defined herein specifically to provide an improved copying apparatus of the slit exposure scanning type having an erect optical imaging system that is both compact and economical, and that can be manufactured and assembled in a relatively economical manner.

Figure 1:
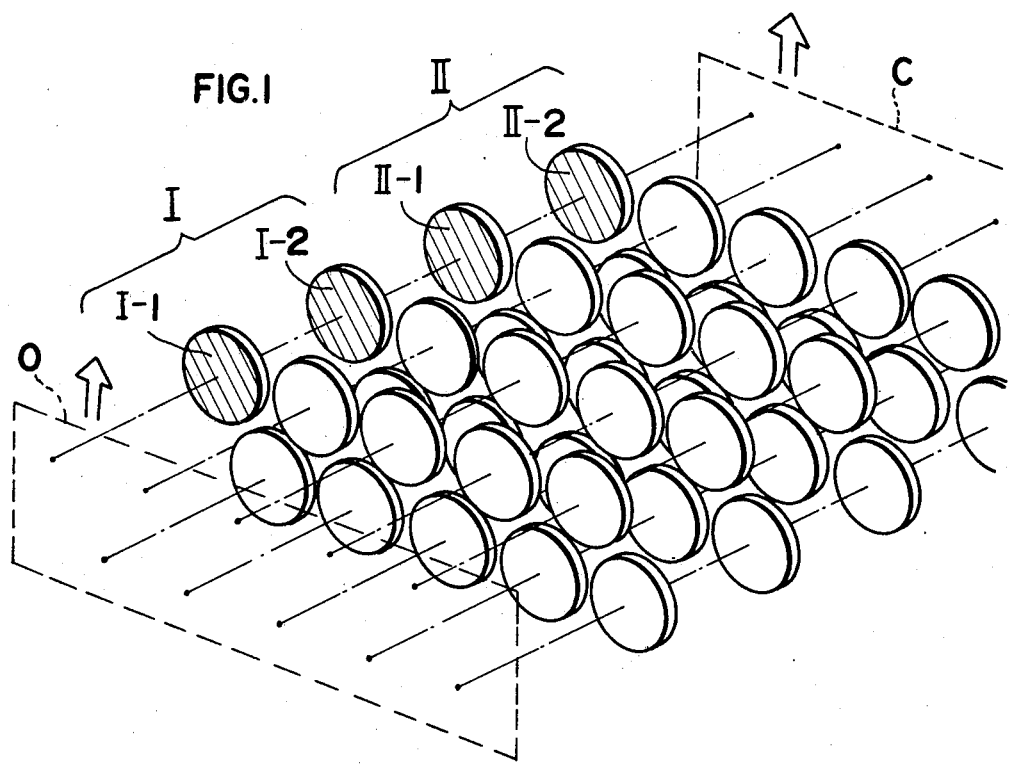
FIG. 1 represents a schematic perspective view of the image transmitter according to the present invention.
Figure 3:
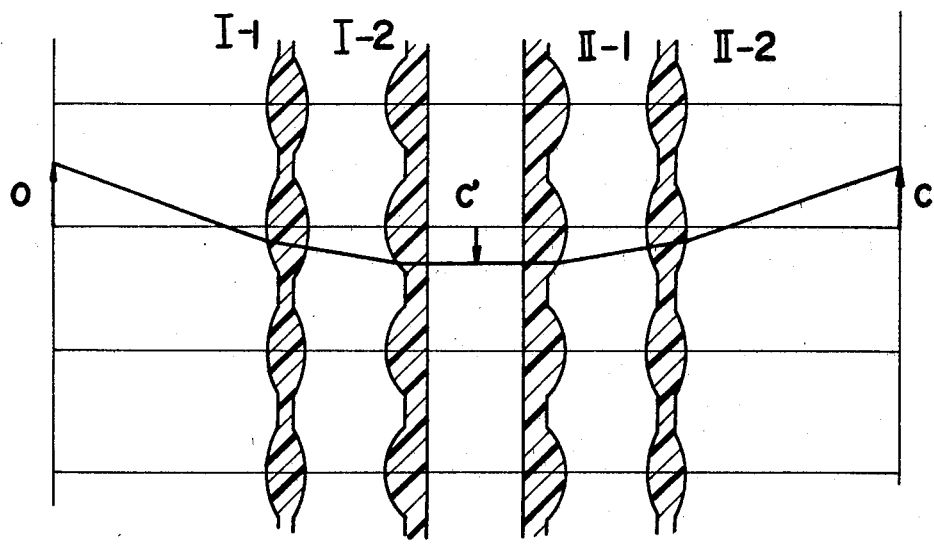
FIG. 3 represents a schematic cross sectional view of a first embodiment of the light transmitter according to the present invention.
Figure 4:
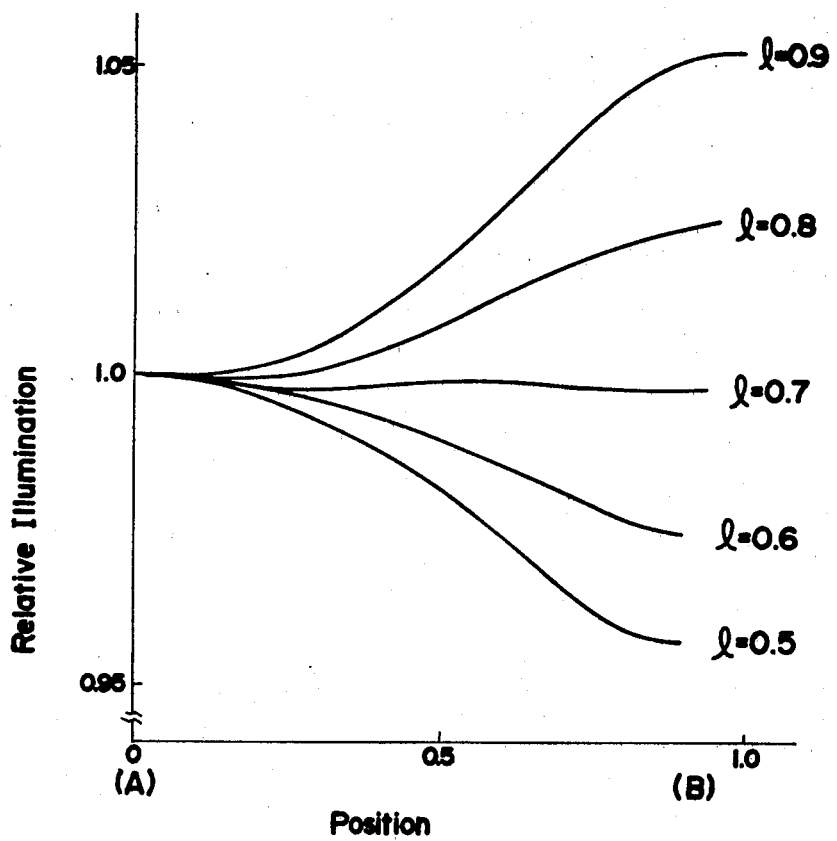
FIG. 4 represents a graphic plot showing a change in illumination in the direction transverse to the scanning direction of the first embodiment.
Figure 5:
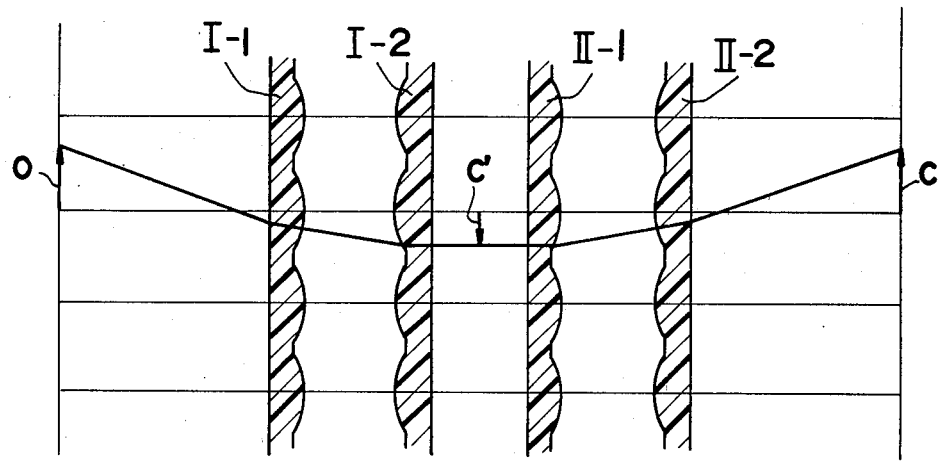
FIG. 5 represents a schematic cross sectional view of a second embodiment of the light transmitter according to the present invention.
Figure 6:
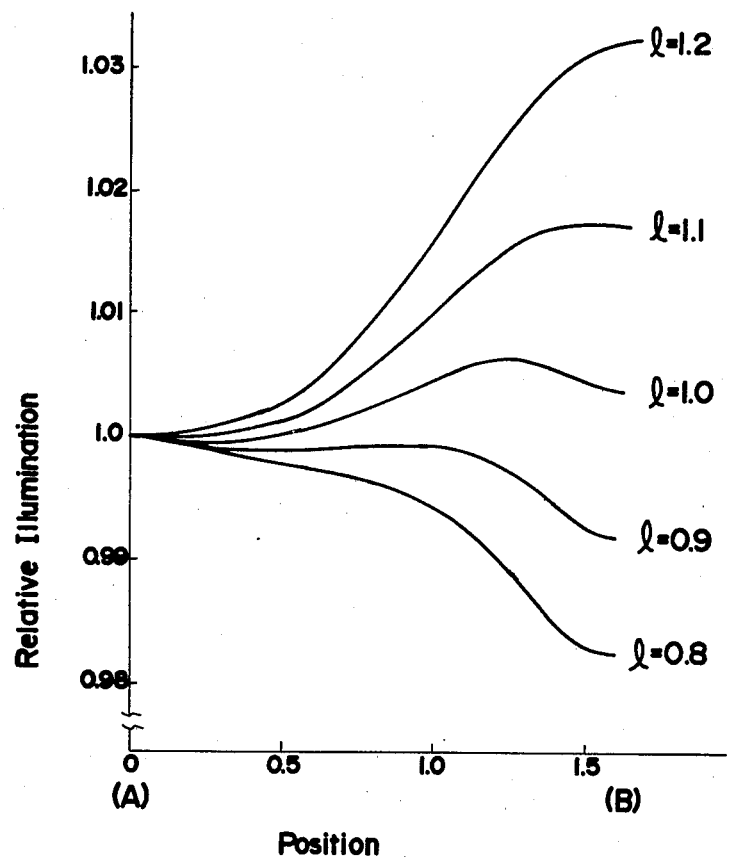
FIG. 6 represents a graphic plot showing a change in illumination in the direction transverse to the scanning direction of the second embodiment.
Figure 7:
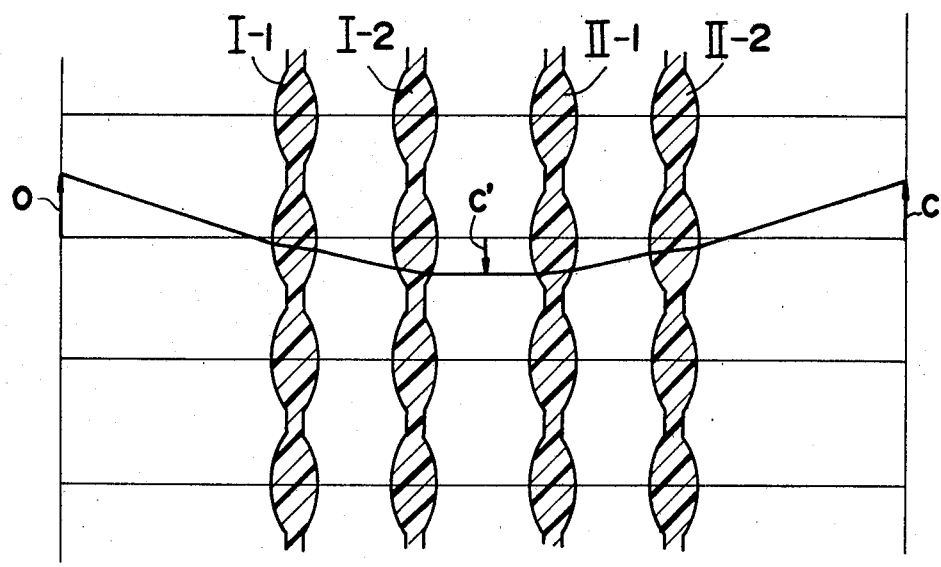
FIG. 7 represents a schematic cross sectional view of a third embodiment of the light transmitter according to the present invention.
Figure 8:
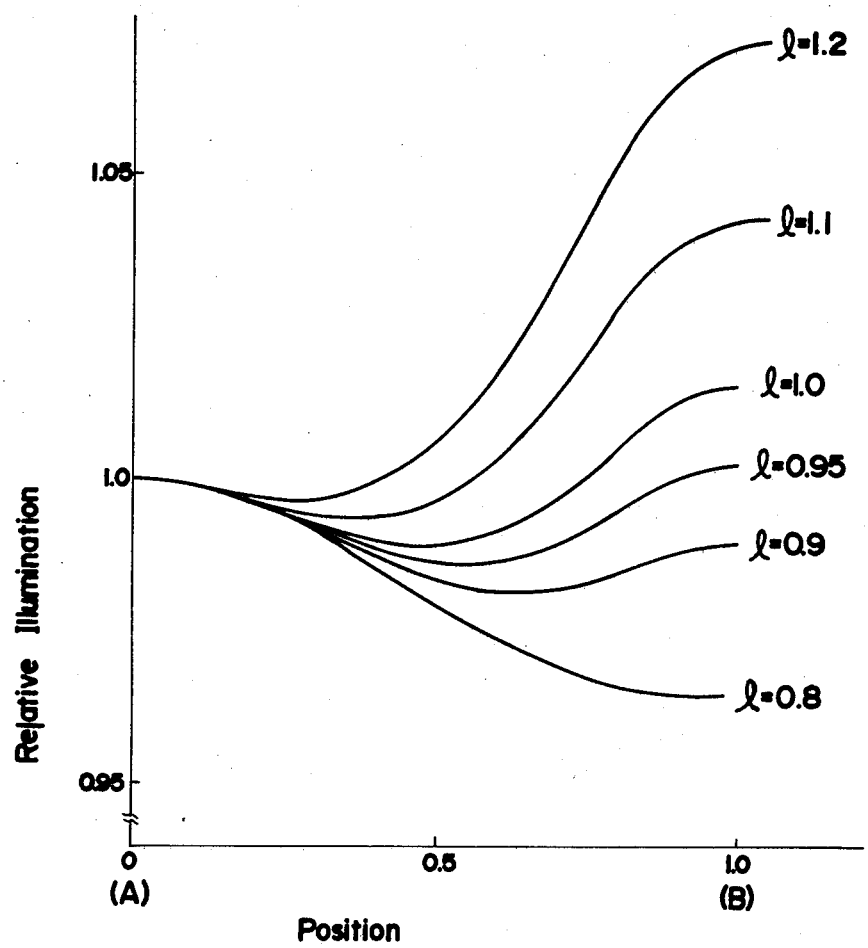
FIG. 8 represents a graphic plot showing a change in illumination in the direction transverse to the scanning direction of the third embodiment.
Figure 9:
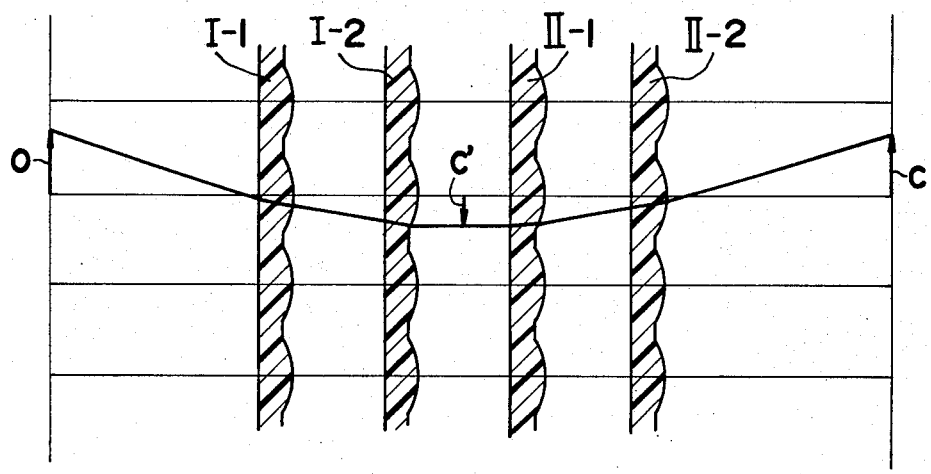
FIG. 9 represents a schematic cross sectional view of a fourth embodiment of the light transmitter according to the present invention.
Figure 10:
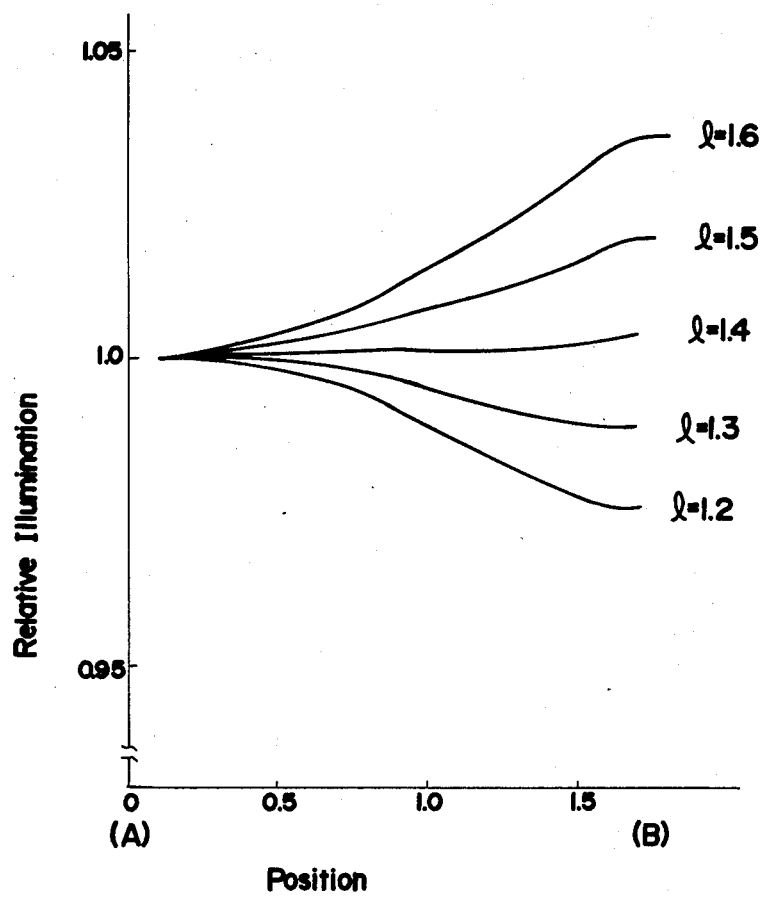
FIG. 10 represents a graphic plot showing a change in illumination in the direction transverse to the scanning direction of the fourth embodiment.

Referring to FIG. 1, an image transmitter, according to the present invention, comprises a plurality of individual rows of erecting lens systems that will be positioned within a copying apparatus in a direction transverse to the scanning direction of an original document. Each of the erecting lens systems includes on its optical axis a first lens group I, consisting of a first and second lens elements, I-1 and I-2, that provide an interim inverted real image of the original, as can be seen in FIG. 3, and a second lens group II, consisting of third and fourth lens elements, II-1 and II-2, for relaying the inverted real image to produce the desired final erect real image of the original on an image recording member, C. The respective images formed by each of the erecting lens systems partially overlap each other on the image recording member, and the image transmitter fulfills the following conditions:

$$0.45 < |\beta_M| < 0.7 \quad (1)$$

$$0.05 < l/D < 0.35 \quad (2)$$

$$0.02 < D/L < 0.05 \quad (3)$$

wherein: $\beta_M$ represents the magnification of the inverted real image formed by the first and second lens elements; D represents the maximum effective aperture of the lens system; l represents the distance between respective edges of the maximum effective apertures of two adjacent erecting lens systems; and L represents the distance along the optical axis between the original and the image recording member.

An individual erecting lens system is disclosed in the perspective of FIG. 1 by the shaded four lens elements that are positioned between the object plane, O, and the image plane, C. As can be seen, a plurality of such erecting lens systems are arranged in parallel rows extending in a direction transverse to the scanning direction indicated by the arrows. Thus, a striped portion or segmented sector of an original document, such as indicated by the broken line of the original, O, is successively scanned and its image is projected onto a corresponding successive striped portion indicated by the partial broken line of the image recording member, C. As the original document and the image recording member are correlatively moved in their respective separate planes relative to the image transmitting optical system, the entire original document is then scanned and recorded.

In the erecting lens systems, the second lens element, I-2, and the third lens element II-1, cooperate to function as a field lens with respect to the inverted real image for improving the uniformity of the erecting real image on the image recording member. It should be noted, however, that the second and third lens elements are located off of the position of the inverted real image and relatively close to the respective first and fourth lens elements, for the purposes of correcting aberrations in cooperation with the first and fourth lens elements. The first to fourth lens elements are relatively thin in axial thickness which has been found to be particularly favorable for manufacturing image transmitting optical systems on a series of plastic sheets. Thus, the respective first lens elements, second lens elements, third lens elements and fourth lens elements are actually arrays of lenses that have been integrally molded on four strips of plastic sheets that are subsequently aligned to form a plurality of individual erecting lens systems having substantially parallel optical axes.

With respect to the above-mentioned condition equations, condition (1) relates to the image forming performance of the lens system in the light transmitter, and particularly to the correction of spherical aberration which is a major consideration. If the lower limit of condition (1) is violated, it would be difficult to correct spherical aberration and an insufficient effective aperture for the lens system will result. Thus, both the image forming performance and the speed of the image transmitter would be unsatisfactory. If the upper limit of condition (1) is violated, it would be difficult to maintain the necessary uniformity in illumination along the direction transversed to the scanning direction, although spherical aberration could be easily corrected. This results because the diameter of the circle of image covered by one erecting lens systems is reduced and creates a difficulty in effectively overlapping images of the neighboring erecting lens systems on the image recording member to provide sufficient uniform illumination.

It is possible to utilize a suitable light shielding mask at either the original or the inverted or erected real images for reducing those light rays directed towards those portions of greater illumination on the image recording member to thereby achieve a uniformity in illumination. Such an illumination level would be adjusted to that portion of the image with lower illumination to which the off rays are directed. However, this method of masking or vignetting only results in a decreased speed for the image transmitter which is undesirable in the present invention.

Figure 2:
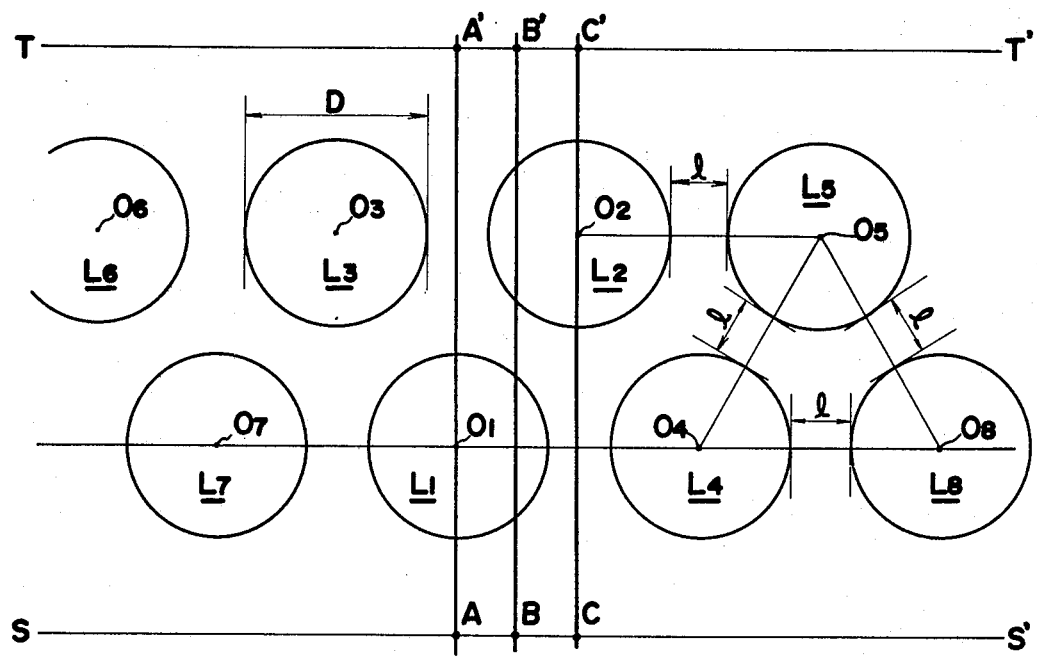
FIG. 2 represents a partial plane view of FIG. 1 observed from the direction of the optical axes of the erecting lens systems.

Condition (2) is provided for achieving a uniformity in illumination by means of insuring the overlapping of the images formed by an erecting lens system that also fulfills the conditions of equation (1). Reference is made to FIG. 2 to appreciate the effects of this condition (2) and more particularly to understand the dimensions involved for l and D. FIG. 2 discloses the image transmitter, according to the present invention, as observed along the direction of the optical axes of the erecting lens systems from the original side. In FIGS. 1 and 2, by the way, the erecting lens systems are arranged in two rows, which arrangement is recommended for achieving effective uniformity in illumination and a low cost of practical manufacturing. As is apparent from FIG. 2, and especially from the relationships among the four erecting lens systems, $L_2$, $L_4$, $L_5$ and $L_8$ having optical axes, $O_2$, $O_4$, $O_5$ and $O_8$, all the neighboring erecting lens systems are spaced apart from each other by the same distance, l. However, the distance along the scanning direction is of less significance as will be explained later.

Lines S-S' and T-T' are disclosed perpendicular to the scanning direction. Provided that the original is uniformly illuminated along the direction parallel with line S-S' or T-T' by a suitable light source, such as a long fluorescent lamp, an image transmitter of a slit exposure scanning type will generally provide a uniform illumination if there is no substantial unevenness in illumination of the image caused during movement of a portion of the original between line S-S' to line T-T'. Any possible unevenness in illumination on the image recording member will periodically occur in a direction parallel with lines S-S' or T-T' in accordance with the individual illumination distribution of each of the erecting lens systems around its respective optical axis and the relative arrangement or array pattern of the erecting lens systems. For example, a point on the image recording member that is tracked on line A-A' is exposed to an illumination determined by the total of the illumination distributions of erecting lens systems $L_1$, $L_2$ and $L_3$ when the point is moving from lines S-S' to T-T'. Due to the symmetric arrangement of the erecting lens systems, the final exposure of a point on line C-C' is designed to be identical with that on line A-A'. Therefore, the period of unevenness along the direction parallel with line S-S' or T-T' is:

$$\overline{AC} = (D+l)/2$$

Such a periodic unevenness in illumination of the image transmitter can result in stripes on a copy paper running along the scanning direction if the unevenness is sufficiently serious. Therefore, the extent of any unevenness in illumination is generally required to be restricted within a range of 5 percent.

If condition (2) is violated with erecting lens systems designed in accordance with condition (1), the unevenness of illumination could possible be over the tolerable range.

In contrast to the importance of the lens array arrangement along a direction perpendicular to the scanning direction, the arrangement in the scanning direction is of less significance. For example, the final unevenness in a direction perpendicular to the scanning direction is not altered if the distance between the first row of erecting lens systems, $L_6$, $L_3$, $L_2$ and $L_5$ and the second row of erecting lens systems, $L_7$, $L_1$, $L_4$, and $L_8$ is changed in the scanning direction.

Condition (3) relates to the speed of the image transmitter. If the lower limit of the condition is violated, the effective F number of the erecting lens system would be too great to be adequately applied to an image transmitter for the copying apparatus. On the contrary, if the upper limit is violated, satisfactory aberration correction would be impossible although the lens speed may be further increased.

The following Tables 1 to 4 represent first to fourth embodiments according to the present invention.

TABLE 1

(Embodiment 1)

L = 77.296  D = 3.0  Effective Fno = 6.6

| | | Radius of Curvature | Axial Distance | Refractive Index | Abbe Number |
|---|---|---|---|---|---|
| I | $r_1$ | 10.456 | | | |
| | | | $d_1$ 3.0 | $n_1$ 1.4914 | $\nu_1$ 57.8 |
| | $r_2$ | −10.456 | | | |
| | | | $d_2$ 8.0 | | |
| | $r_3$ | 6.400 | | | |
| | | | $d_3$ 3.0 | $n_2$ 1.4914 | $\nu_2$ 57.8 |
| | $r_4$ | ∞ | | | |
| | | | $d_4$ 10.0 | | |
| II | $r_5$ | ∞ | | | |
| | | | $d_6$ 3.0 | $n_3$ 1.4914 | $\nu_3$ 57.8 |
| | $r_6$ | −6.400 | | | |
| | | | $d_7$ 8.0 | | |
| | $r_7$ | 10.456 | | | |
| | | | $d_8$ 3.0 | $n_4$ 1.4914 | $\nu_4$ 57.8 |

TABLE 1-continued (Embodiment 1)

L = 77.296  D = 3.0  Effective Fno = 6.6

| | Radius of Curvature | Axial Distance | Refractive Index | Abbe Number |
|---|---|---|---|---|
| $r_8$ | −10.456 | | | |

$\beta_M = -0.54$  $l = 0.7$
Distance from Original to Front Surface ($r_1$) of Electing Lens System = 19.648
MTF at 10 lines/mm ≈ 0.5

TABLE 2

(Embodiment 2)

L = 203.522  D = 5.5  Effective Fno = 9.8

| | | Radius of Curvature | Axial Distance | Refractive Index | Abbe Number |
|---|---|---|---|---|---|
| I | $r_1$ | ∞ | | | |
| | | | $d_1$ 3.0 | $n_1$ 1.4914 | $\nu_1$ 57.8 |
| | $r_2$ | −15.088 | | | |
| | | | $d_2$ 28.0 | | |
| | $r_3$ | 15.088 | | | |
| | | | $d_3$ 3.0 | $n_2$ 1.4914 | $\nu_2$ 57.8 |
| | $r_4$ | ∞ | | | |
| | | | $d_4$ 32.0 | | |
| II | $r_5$ | ∞ | | | |
| | | | $d_5$ 3.0 | $n_3$ 1.4914 | $\nu_3$ 57.8 |
| | $r_6$ | −15.088 | | | |
| | | | $d_6$ 28.0 | | |
| | $r_7$ | 15.088 | | | |
| | | | $d_7$ 3.0 | $n_4$ 1.4914 | $\nu_4$ 57.8 |
| | $r_8$ | ∞ | | | |

$\beta_M = -0.55$  $l = 1.0$
Distance from Original to Front Surface ($r_1$) of Electing Lens System = 51.761
MTF at 10 lines/mm ≈ 0.5

TABLE 3

(Embodiment 3)

L = 76.818  D = 3.0  Effective Fno = 5.8

| | | Radius of Curvature | Axial Distance | Refractive Index | Abbe Number |
|---|---|---|---|---|---|
| I | $r_1$ | 10.261 | | | |
| | | | $d_1$ 3.0 | $n_1$ 1.4914 | $\nu_1$ 57.8 |
| | $r_2$ | −10.261 | | | |
| | | | $d_2$ 8.0 | | |
| | $r_3$ | 10.261 | | | |
| | | | $d_3$ 3.0 | $n_2$ 1.4914 | $\nu_2$ 57.8 |
| | $r_4$ | −10.261 | | | |
| | | | $d_4$ 10.0 | | |
| II | $r_5$ | 10.261 | | | |
| | | | $d_5$ 3.0 | $n_3$ 1.4914 | $\nu_3$ 57.8 |
| | $r_6$ | −10.261 | | | |
| | | | $d_6$ 8.0 | | |
| | $r_7$ | 10.261 | | | |
| | | | $d_7$ 3.0 | $n_4$ 1.4914 | $\nu_4$ 57.8 |
| | $r_8$ | −10.261 | | | |

$\beta_M = -0.52$  $l = 0.95$
Distance from Original to Front Surface ($r_1$) of Electing Lens System = 19.409
MTF at 10 lines/mm ≈ 0.5

TABLE 4

(Embodiment 4)

L = 209.777  D = 5.5  Effective Fno = 9.1

| | | Radius of Curvature | Axial Distance | Refractive Index | Abbe Number |
|---|---|---|---|---|---|
| I | $r_1$ | ∞ | | | |
| | | | $d_1$ 3.0 | $n_1$ 1.4914 | $\nu_1$ 57.8 |
| | $r_2$ | −15.088 | | | |
| | | | $d_2$ 28.0 | | |
| | $r_3$ | ∞ | | | |
| | | | $d_3$ 3.0 | $n_2$ 1.4914 | $\nu_2$ 57.8 |
| | $r_4$ | −15.088 | | | |
| | | | $d_4$ 32.0 | | |

TABLE 4-continued

| | | (Embodiment 4) | | | | | |
|---|---|---|---|---|---|---|---|
| L = 209.777 Radius of Curvature | | D = 5.5 Axial Distance | | Effective Fno = 9.1 Refractive Index | | | Abbe Number |
| II | $r_5$ | ∞ | | | | | |
| | | | $d_5$ | 3.0 | $n_3$ | 1.4914 $\nu_3$ | 57.8 |
| | $r_6$ | −15.088 | | | | | |
| | | | $d_6$ | 28.0 | | | |
| | $r_7$ | ∞ | | | | | |
| | | | $d_7$ | 3.0 | $n_4$ | 1.4914 $\nu_4$ | 57.8 |
| | $r_8$ | −15.088 | | | | | |

$\beta_M = -0.54 \quad 1 = 1.4$
Distance from Original to Front Surface ($r_1$) of
Electing Lens System = 53.883
MTF at 10 lines/mm ≈ 0.4

FIGS. 3, 5, 7 and 9 show schematic cross sectional views of the first to fourth embodiments, respectively. The cross sectional views in these Figures reveal that the first lens elements, the second lens elements, the third lens elements and the fourth lens elements are made as integrally molded strips of plastic sheets, respectively. However, it should be noted that FIGS. 3, 5, 7 and 9 are not realistic illustrations of the embodiments, but are illustrated by exaggerating the features, since the diameters and the curvatures of the lens elements relative to the conjugate distance are really too small to be suitably perceived. In these Figures, C' represents the inverted real image temporarily formed by the first lens group, I.

In each embodiment, the value for l is selected to achieve a restrained unevenness within a variation of 1 percent.

FIGS. 4, 6, 8 and 10 graphically show the periodic variation in illumination in the direction transverse to the scanning direction when changing the value for l. The position is plotted from point A to B since the periodic variation in illumination is apparently symmetric with respect to line B-B' and the variation from point B to C is obvious. FIGS. 4, 6, 8 and 10 further show that the variation in illumination is within 5 percent if the condition (2) is fulfilled.

As is apparent from the above Tables 1 to 4 and FIGS. 3, 5, 7 and 9, the lens elements in the embodiments are formed as plano-convex plastic lens elements or biconvex symmetric plastic lens elements. The use of a plano-convex plastic lens element has an advantage in that one of the pair of molds for forming an integral strip of lenses can simply be a plane surface and nothing would be influenced by any dislocation between the molds in a direction perpendicular to the optical axis. On the other hand, a biconvex symmetric plastic lens element has an advantage in that the lens element can be assembled without identifying between a right or wrong side.

In the first to third embodiments, it should be noted that the erecting lens system is symmetric with respect to the inverted real image, C', for the purpose of improving the image forming performance of the individual erecting lens systems. The second to fourth embodiments consist of only a single kind of lens element for the purpose of reducing the kinds of elements necessary to assemble the image transmitter. Finally, in the fourth embodiment, it should be noted that all lens elements face their convex surfaces to the same side. This arrangement is effective for reducing any influence of error in molding on the total image forming performance of the image transmitter since a portion of the image is transmitted through identical portions of the four integral strips of lenses which are molded by the same mold.

It is to be further understood that various modifications of the generic concepts of the present invention are possible without departing from its spirit and, accordingly, the scope of the present invention should be determined solely from the following claims.

I claim:

1. In a copying apparatus of a slit exposure scanning type in which an original and an image recording member are correlatively movable in a scanning direction relative to an image transmitter optically positioned therebetween so that images of successive striped portions of the original extending in a direction transverse to the scanning direction are scanned and projected onto the image recording member successively by the image transmitter to thereby form a complete image of the original, the image transmitter comprising a plurality of rows of erecting lens systems arranged in a transverse direction, each erecting lens systems including on its optical axis a first and second lens element for temporarily forming an inverted real image of the original and a third and fourth lens elements for relaying the inverted real image to finally form an erecting real image of the original on the image recording member, all of the first to fourth lens elements are biconvex symmetric lens elements, wherein the images formed by the respective erecting lens systems partially overlap each other on the image recording member and the image transmitter fulfills the following conditions:

$$0.45 < /\beta_M/ < 0.7$$

$$0.05 < l/D < 0.35$$

wherein: $\beta_M$ represents the magnification of the inverted real image formed by the first and second lens elements, D represents the maximum effective aperture of the lens system, and l represents the distance between respective edges of the maximum effective apertures of two adjacent erecting lens systems along the transverse direction.

2. The invention of claim 1, wherein the image transmitter further fulfills the following condition:

$$0.02 < D/L < 0.05$$

wherein L represents the distance along the optical axis between the original and the image recording member.

3. The invention of claim 1, wherein the first to fourth lens elements are of plastic.

4. The invention of claim 3 further comprising four strips of plastic sheets of the same material as that of the plastic lens elements, wherein the first lens elements, the second lens elements, the third lens elements, and the fourth lens elements of all the erecting lens elements are integrally molded on the four plastic sheets, respectively.

5. In a copying apparatus of a slit exposure scanning type in which an original and an image recording member are correlatively movable in a scanning direction relative to an image transmitter optically positioned therebetween so that images of successive striped portions of the original extending in a direction transverse to the scanning direction are scanned and projected onto the image recording member successively by the image transmitter to thereby form a complete image of the original, the image transmitter comprising a plurality of rows of erecting lens systems arranged in a transverse direction, each erecting lens system including on its optical axis a first and second lens element for temporarily forming an inverted real image of the original and a third and fourth lens elements for relaying the inverted real image to finally form an erecting real image of the original on the image recording member, the first to fourth lens elements consist of a pair of biconvex symmetric lens elements and a pair of plano-convex lens elements, wherein the images formed by the respective erecting lens systems partially overlap each other on the image recording member and the image transmitter fulfills the following conditions:

$$0.45 < /\beta_M/ < 0.7$$

$$0.05 < l/D < 0.35$$

wherein: $\beta_M$ represents the magnification of the inverted real image formed by the first and second lens elements, D represents the maximum effective aperture of the lens system, and l represents the distance between respective edges of the maximum effective apertures of two adjacent erecting lens systems along the transverse direction.

6. The invention of claim 5, wherein the third and fourth lens elements are symmetrical with the second and first lens elements, respectively, with respect to the inverted real image.

7. In a copying apparatus of a compact slit exposure scanning type wherein an original and an image recording member are correlatively movable in separate planes relative to an image transmitting optical system for transmitting the original indicia onto the recording member, the improvement comprising from an original plane to the image plane:
 a first array of biconvex lens elements adjacent the original plane;
 a second array of plano-convex lens elements convex side towards the first array;
 a third array of plano-convex lens elements, plano side towards the second array, and
 a fourth array of biconvex lens elements adjacent the image plane, the respective lenses in each array aligned to form a plurality of erecting lens systems, wherein the image transmitting optical system fulfills the following conditions:

$$0.45 < /\beta_M/ < 0.7$$

$$0.05 < l/D < 0.35$$

wherein: $\beta_M$ represents the magnification of the inverted real image formed by the first and second lens elements; D represents the maximum effective aperture of the lens system; and l represents the distance between respective edges of the maximum effective apertures of two adjacent erecting lens systems along the transverse direction.

8. The invention of claim 7 wherein each array is formed on a plastic sheet.

9. The invention of claim 7 wherein the image transmitting optical system fulfills the following condition:

$$0.02 < D/L < 0.05$$

wherein L represents the distance between the original and the image recording planes, and D represents the maximum effective aperture of each lens system.

10. In a copying apparatus of a slit exposure scanning type in which an original and an image recording member are correlatively movable in a scanning direction relative to an image transmitter optically positioned therebetween so that images of successive striped portions of the original extending in a direction transverse to the scanning direction are scanned and projected onto the image recording member successively by the image transmitter to thereby form a complete image of the original, the image transmitter including a plurality of rows or erecting lens systems arranged in the transverse direction, each of the erecting lens systems comprising on its optical axis:
 a first and a second biconvex symmetric lens element for temporarily forming an inverted real image of the original; and
 a third and fourth biconvex symmetric lens element for relaying the inverted real image to finally form an erecting real image of the original on the image recording member, wherein the images formed by the respective erecting lens systems partially overlap each other on the image recording member.

11. The invention of claim 10, wherein the image transmitter fulfills the following conditions:

$$0.05 < l/D < 0.35$$

$$0.02 < D/L < 0.05$$

wherein l represents the distance between respective edges of the maximum effective apertures of two adjacent erecting lens systems along the transverse direction, L represents the distance between the original and the image recording member, and D represents the maximum effective aperture of each erecting lens system.

12. In a copying apparatus of a slit exposure scanning type in which an original and an image recording member are correlatively movable in a scanning direction relative to an image transmitter optically positioned therebetween so that images of successive striped portions of the original extending in a direction transverse to the scanning direction are scanned and projected onto the image recording member successively by the image transmitter to thereby form a complete image of the original, the improvement of the image transmitter comprising a plurality of rows of erecting lens systems arranged in the transverse direction, each of the erecting lens systems consisting, on its optical axis of:
 a first and a second lens element located apart from each other for temporarily forming an inverted real image of the original; and
 a third and a fourth lens element located apart from each other for relaying the inverted real image to finally form an erected real image of the original on the image recording member wherein the images formed by the respective erecting lens systems partially overlap each other on the image recording member wherein the image transmitter fulfills the following conditions:

$$0.05 < l/D < 0.35$$

$$0.02 < D/L < 0.05$$

wherein l represents the distance between respective edges of the maximum effective apertures of two adjacent erecting lens systems along the transverse direction, L represents the distance between the original and the image recording member, and D represents the maximum effective aperture of each erecting lens system.

13. The invention of claim 12, wherein at least one convex surface is projecting into an air space between the first and second lens elements and into an air space between the third and fourth lens elements, respectively.

14. The invention of claim 12, wherein the third and fourth lens elements are symmetrical with the second and first lens elements, respectively, with respect to the inverted real image.

15. The invention of claim 12, wherein an air space between the first and second lens elements and an air space between the third and fourth lens elements are each biconcave.

16. The invention of claim 12, wherein the first to fourth lens elements are all convex to an identical direction.

* * * * *

UNITED STATES PATENT OFFICE
CERTIFICATE OF CORRECTION

Patent No. 4,448,499                    Dated May 15, 1984

Inventor(s) Hisashi Tokumaru

It is certified that error appears in the above-identified patent and that said Letters Patent are hereby corrected as shown below:

On the cover page 1, under [30] "Foreign Application Priority Data," delete "May 25, 1980" and insert--May 29, 1980--.

Signed and Sealed this

Twenty-sixth Day of August 1986

[SEAL]

Attest:

DONALD J. QUIGG

Attesting Officer

Commissioner of Patents and Trademarks